Figure 1:
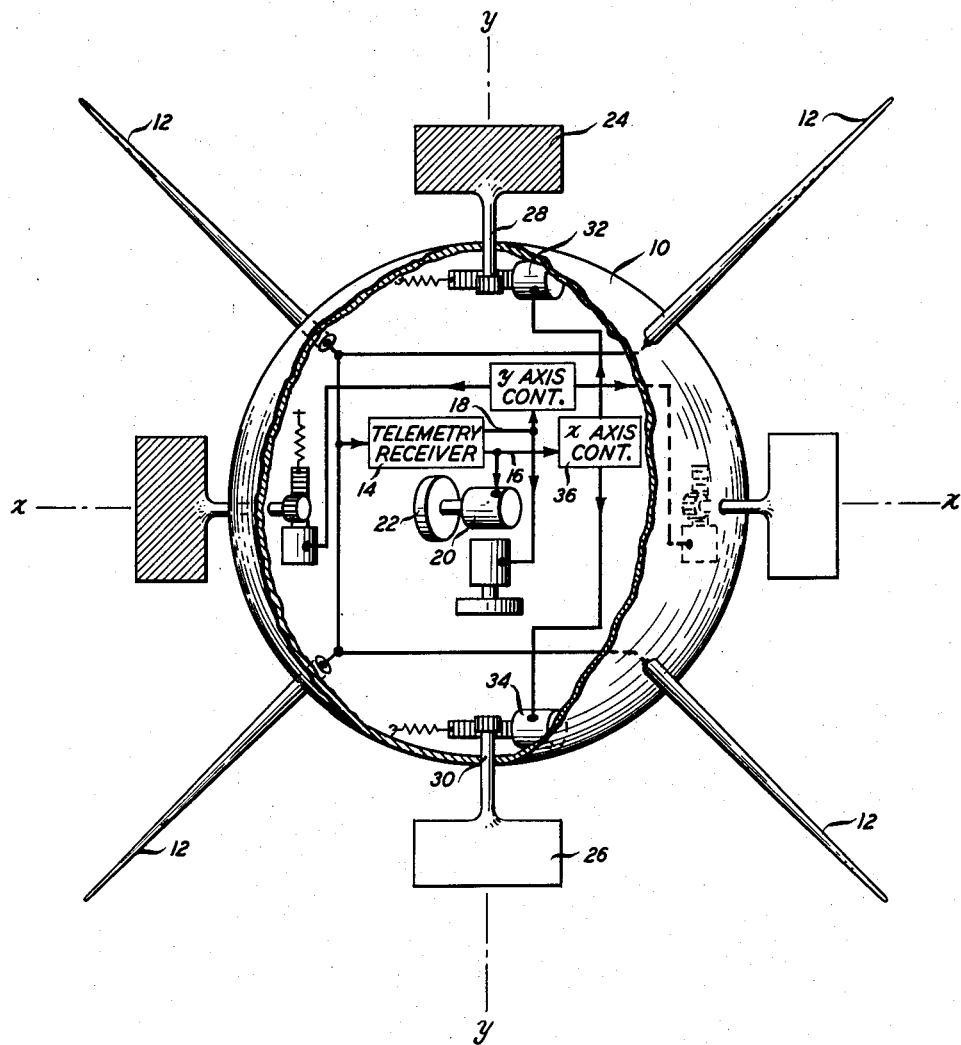

Dec. 31, 1963 C. C. CUTLER 3,116,035
ATTITUDE CONTROL OF EARTH SATELLITES
Filed Oct. 1, 1959 2 Sheets-Sheet 1

INVENTOR
C. C. CUTLER
BY
ATTORNEY

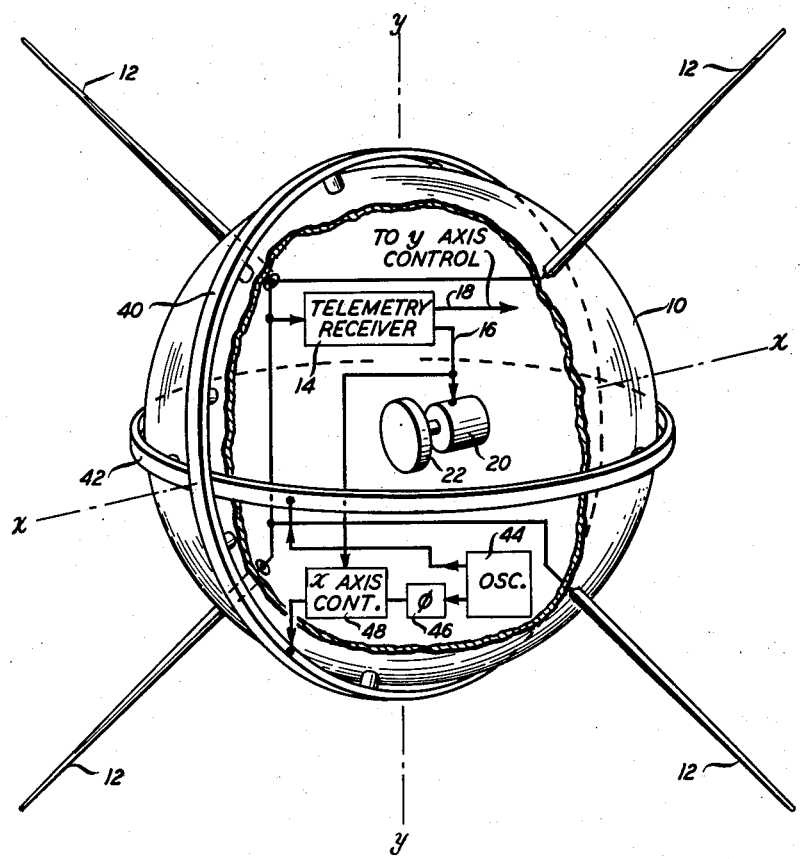

United States Patent Office 3,116,035
Patented Dec. 31, 1963

3,116,035
ATTITUDE CONTROL OF EARTH SATELLITES
Cassius C. Cutler, Gillette, N.J., assignor to Bell Telephone Laboratories, Incorporated, New York, N.Y., a corporation of New York
Filed Oct. 1, 1959, Ser. No. 843,678
5 Claims. (Cl. 244—1)

This invention relates to earth satellites and more particularly to arrangements for controlling the orientation or attitude of earth satellites intended for use as terminal or repeater stations in radio communication systems.

There has been much recent interest in the use of earth satellites as terminal or relay stations in radio communication systems. Proposals for such systems have included the use of relatively simple earth satellites which are designed to serve as so-called passive repeaters for communication systems extending between spaced points and so arranged that the earth satellite reflects a signal from one terminal to another terminal which is beyond the line-of-sight distance from the first terminal. More sophisticated radio systems have been proposed wherein the earth satellite serves as an active repeater and in these systems the satellite vehicle includes at least a radio receiver and a radio transmitter whereby signals arriving on the satellite at a low level may be rebroadcast in the direction of a receiving terminal at a higher level.

In all except the simplest possible repeaters having isotropic reflectors or antennas the need exists for orienting the satellite vehicle in such a way that the reflecting surface or the transmitting and receiving antennas are directed for transmission or retransmission in the most effective manner toward the terminal stations. Orientation or attitude control systems suitable for such purposes may take a variety of forms and in some instances, as for example, in the arrangements disclosed in my copending application Serial No. 829,817, filed July 27, 1959, (now United States Patent No. 3,048,350, August 7, 1962,) my joint application with J. R. Pierce, Serial No. 822,334, filed June 23, 1959, (now United States Patent 3,048,351, August 7, 1962,) and the application of P. L. Donoho, Serial No. 833,040, filed August 11, 1959 (now United States Patent No. 3,048,351, August 7, 1962), a space satellite vehicle may be oriented by maintaining it spinning about an axis normal to the plane of its orbit. In certain instances, however, it is desirable to have more complete control of the orientation of the satellite so that variations in orbit may be accounted for or so that it may be used selectively as a repeater for transmission between different terminal stations. Under these circumstances, remote control systems have been proposed wherein the orientation of the satellite may be controlled by telemetry signals produced at a terminal station and sent to a satellite over a narrow band radio channel. Here, the problem becomes one of providing equipment aboard the satellite for responding to such signals appropriately to adjust the orientation of the satellite about one or more control axes.

It is noted that remote control of devices previously proposed for maintaining the spin of a satellite launched initially spinning in orbit does not exert a correcting torque of sufficient magnitude to correct for displacements from a desired satellite orientation within a practicable time interval. The torques so produced are small and must act continuously for extended periods if a significant effect is to be obtained.

On the other hand, one effective method of controlling the attitude of a space satellite in response to externally generated signals makes use of the principle of conservation of momentum. Thus, it has been shown that the orientation of a space vehicle about a chosen control axis may be adjusted through the use of a small mass located within the satellite and rotated about the same axis in response to an external control signal. Thus, if it is desired to rotate the much larger mass of the satellite in a clockwise direction about the control axis, the small mass is rotated in a counterclockwise direction at a sufficiently high angular velocity to produce an angular momentum equal and opposite to that required to rotate the satellite to the new angular position. An obvious extension of this kind of control system involves the use of two control axes each in its own remotely controlled rotatable mass and provides more complete control of the spatial orientation of the satellite vehicle.

It has been found, however, that such systems are subject to important limitations which render them essentially impracticable for use in the precise control of satellite orientation. It will be recognized that the conservation of momentum principle employed has inherent limitations which are reached when the small remotely controlled mass is rotating at its maximum possible angular velocity. Any control command requiring further angular acceleration of the satellite opposite to the direction of rotation of the controlled mass obviously cannot be accommodated. Thus, there must be no external torques acting upon the satellite in such a way as to produce an increasing angular momentum of the satellite about the controlled axis. For example, the action of magnetic fields, solar radiation, or micrometeorite impacts may cause the gradual accumulation of angular momentum about the controlled axis. In addition, in any but a true polar orbit, precession of the orbit may require a progressive correction of orientation exceeding the capability of the system.

It is accordingly the object of the present invention to improve the accuracy and range of control of the atttiude of a space satellite afforded by orientation systems employing the principle of conservation of momentum.

In accordance with the above object, the attitude of an earth satellite about a controlled axis is adjusted in response to remotely generated signals by producing an appropriate angular acceleration of a controlled mass about the controlled axis and in a sense opposite to that required of the satellite. The build-up of stray angular momentum to levels exceeding the control capability of the system is prevented by the provision of means for aiding the effect of the controlled mass and reversing the aiding means each time the external control signals require a change in the sense of rotation of the controlled mass. The aiding torque is much less than that afforded by the controlled mass but may be sufficient to oppose such residual torques as those mentioned above. Such aiding torques may be produced by the passage of current through an appropriately oriented conducting loop mounted on the satellite and arranged to interact with the earth's magnetic field or through the use of solar vanes arranged to be driven by the radiation pressure of the sun and reversible in orientation with respect to the satellite to reverse the sense in which the satellite is driven in response to such radiation pressure.

The above and other features of the invention will be considered in detail in the following specification taken in connection with the drawings in which:

FIG. 1 is a schematic diagram of a space satellite, according to the invention, wherein the correcting torque is produced through the use of solar vanes or paddles; and FIG. 2 is a schematic diagram of a space satellite wherein the correcting torque is produced by current-carrying loops arranged to interact with the earth's magnetic field.

The satellite of FIG. 1 is indicated as comprising essentially a spherical body 10 and is provided with spaced antennas 12 by which telemetry signals radiated from a control station may be received. The four antennas are connected together and to the input of a telemetry receiver 14 which may be a conventional narrow band radio receiver of well-known design. It is assumed that in common with many telemetry systems, the controlled signals radiated from the terminal stations may include at least two communication or control channels corresponding to the two controlled axes of the satellite so that the orientation of the satellite vehicle in space may be completely determined. As a matter of convenience, these axes may be referred to as $x$ and $y$ axes oriented as indicated in FIG. 1. The output of telemetry receiver 14 then comprises at least two seperate control channels 16 and 18 corresponding respectively to the $x$ and $y$ axes to be controlled.

The drive means for maintaining or adjusting the orientation of the satellite about a particular controlled axis makes use of the principle of conservation of angular momentum referred to above. The arrangements are identical for the $x$ and $y$ axes, and that provided for the control of the $x$ axis comprises simply a small electrical motor 20, arranged to rotate a small flywheel 22 about the $x$ axis. While the motor is shown as driving a separate flywheel, the mass of the rotor of the motor itself may be sufficient to accomplish the desired orientation-adjusting function. On the other hand, where the angular velocities required are greater, it may be desirable to drive portions of the satellite structure itself by the control motor to increase the angular momentum which may be produced in response to external control signals. While the exact nature of the control signals required will depend upon the particular motor provided, it is assumed that motor 20 may be caused to rotate in either direction in response to the output appearing on control channel 16 of telemetry receiver 14. In some instances, simple On and Off control of the motor may be employed, while in others it may be desirable to control both the direction and angular velocity of the controlled mass or flywheel 22. In any event, it will be understood that if it is desired to rotate the satellite in a clockwise direction with respect to a chosen axis, motor 20 will operate to drive the controlled mass in a counterclockwise direction about that particular axis.

It will be understood that in the absence of external torque acting about the $x$ axis, the orientation of satellite 10 about this axis may be adjusted as required by rotation of flywheel 22 in the opposite sense about the same axis. The required angular velocity required of the flywheel or controlled mass 22 is determined by the speed of orientation correction required for the satellite and the mass of flywheel 22 also is determined by the speed requirement. It will be understood, however, that in any event a practical limit exists as to the maximum angular velocity with which flywheel 22 may be driven. If this limit, and the corresponding limit of angular momentum of the controlled mass is reached and this angular momentum is not sufficient to correct the rotation of the satellite, the control system must fail.

Generally, any accumulation of angular momentum of the satellite as a whole about the controlled axis as a result of the application of external torques will defeat the operation of the remote controlled drive system. Thus, if the satellite, either because of transient effects upon launching or because of the action of the earth's field, micrometeorite impact, or the like, accumulates angular momentum about the $x$ axis, the amount of angular momentum required of the controlled mass to maintain the orientation of the satellite fixed about this axis will be greater for one direction of rotation than for the other. Thus, over an extended period of time, the maximum capability of the control system may be exceeded and control of the orientation of the satellite about this axis may be at lost. Even if the requirements are not beyond the capability of the control system, residual angular momentum calling for continuous correction increases wear and consumes power, thus reducing the useful life of the satellite.

According to the invention, therefore, means are provided on the satellite for producing a small torque about the controlled axis acting in a direction appropriate to oppose the accumulation of a net angular momentum about this axis. As shown in FIG. 1, there is provided for the purpose of introducing such a correcting torque about the $x$ axis, an array of vanes or paddles, of which vanes 24 and 26 are typical, mounted on the surface of the satellite and normally oriented to lie in planes including the $x$ axis. These vanes, which may be referred to as solar vanes, are designed to interact with radiation from the sun to produce torques about the $x$ axis. It will be understood, of course, that although only two such vanes are shown, it may be convenient to provide a large number of such vanes, all located in planes including the $x$ axis and distributed about the periphery of the satellite generally in a plane normal to the $x$ axis. Each of vanes 24 and 26 has its opposing surfaces treated in such a way that they will react in a different way to solar radiation. Thus coatings may be applied so that one surface will reflect radiation from the sun and the other will absorb such radiation. Conveniently, one such coating may be highly polished or mirrorlike and the other highly absorptive. It can be shown that because of the difference in the specular nature of the radiation reflected from a shiny surface and that absorbed and reradiated from an absorptive surface, a net force will be exerted causing the shiny surface to retreat from the source of radiation. This phenomenon is considered in more detail in the copending application Serial No. 822,334, referred to above. Such action, in response to the radiation from the sun, may be caused to produce a net torque about the $x$ axis by so arranging vanes 24 and 26 that the net forces acting upon the individual vanes will combine in aiding relationship. Thus, as shown in FIG. 1, the visible surface of vane 24 is made absorbing while the visible surface of vane 26 is made reflecting. It will be recognized that in the arrangement as shown, the response to the pressure of radiation from the sun will be to produce a net torque about the $x$ axis in such direction as to cause vane 26 to retreat from the viewer.

The arrangement thus far described would suffice to prevent or oppose the accumulation of net angular momentum of the satellite in the counterclockwise sense, as seen from the left-hand end of the $x$ axis in FIG. 1, and would serve to prevent control system failure so long as distributing torques were always in this sense. Since this may not be the case, however, in any practical arrangement means are provided for reversing the sense of the torque produced by solar vanes 24 and 26. To this end, vanes 24 and 26 are mounted on shafts 28 and 30, respectively, so that they may be rotated through 180 degrees to present to incoming radiation from the sun the surfaces opposite to those shown in FIG. 1. The rotating means are shown schematically in FIG. 1 as comprising small spring biased solenoids 32 and 34, respectively, although it will be recognized that other devices, such as motors or the like, may equally well be employed. In any event, solenoids 32 and 34 or their equivalents are arranged to operate together to reverse the position of the solar vanes and in response to the output of the $x$-axis channel 16 of telemetry receiver 14. It is obvious, however, that the control here required is strictly an On or Off control and conveniently the torques produced by the vanes may be caused to prevent the accumulation of any net average angular momentum of the satellite by reversing the vanes each time the $x$-axis drive motor 20 is reversed in response to the remotely generated control signals. A portion of the output of control channel 16, therefore, is applied to a device designated $x$-axis control 36, the function of which is to produce an appropriate control signal each time the polarity or phase of the control signal appearing on channel 16 is reversed. The exact nature of x-axis control means 36 will depend upon the drive mechanism employed. In the case of the solenoids shown in FIG. 1, the control means is required to produce an output in response to telemetry signals requiring one direction of rotation of motor 20 and no output for signals requiring the other direction of rotation of this motor. These requirements can be met by a simple switching circuit which is responsive to produce an output only in response to one polarity or phase of the control signal in channel 16. If, for example, a direct-current control signal is available, a relay or a flip-flop circuit made up of solid-state devices would suffice.

Additional control systems corresponding exactly to that provided for the x axis may be provided as shown, for example, for the y axis and arranged to operate in response to signals on control channel lead 18.

A modification of the satellite orientation control arrangement of FIG. 1 is illustrated in FIG. 2 of the drawing. Here, satellite vehicle 10 is provided with a telemetry receiver 14 and antennas 12 corresponding in all respects to those shown in FIG. 1 and arranged to provide outputs in x- and y-axis control channels 16 and 18 in the same manner. A motor 20 is arranged to drive a controlled mass 22 to provide rotation of the satellite about the x axis as in the arrangement of FIG. 1.

In the arrangement of FIG. 2, however the correcting torques provided, in accordance with the invention, to reduce the accumulation of undesirable net angular momentum of the satellite are generated by the interaction of current-carrying loops mounted on the satellite and the earth's magnetic field. The action of such current-carrying loops to provide a torque about an axis in the plane of the loop is considered in my copending application Serial No. 829,817, referred to above. It is sufficient to note, however, that if at least two current-carrying loops are mounted on the satellite and are oriented in planes which intersect along the axis to be controlled, the passage of appropriately phased alternating currents through these loops may be employed to produce a torque about this axis. At least two loops are required to eliminate ambiguity and the phase relationship between the alternating currents which are passed through these loops depends upon the physical angular relationship between planes of the loops. Accordingly, and as shown in FIG. 2, a control torque about the x axis of satellite 10 may be afforded by a pair of loops 40 and 42 mounted in planes normal to one another and intersecting along the x axis. A small oscillator 44 is arranged through the provision of a phase shifter 46 to produce two quadrature sinusoidal outputs. This oscillator may comprise a simple transistor-oscillator powered by solar cells located on the surface of the satellite or it may be any other suitable source. In any event, the two outputs of oscillator 44 are applied to a control element 48 and are directed therethrough to current-carrying loops 40 and 42, respectively. In this instance, control element 48 comprises a simple reversing device for one of the outputs of oscillator 44, for example, that applied to current loop 40, and acts effectively to introduce a 180 degree phase shift in the current applied to that loop. In this manner, the torque produced about the x axis by the flow of currents in loops 40 and 42 may be reversed. Control unit 48 accordingly is made responsive to the polarity or phase of the control signal in control channel 16 for the x axis.

An exactly similar arrangement may be provided for control of the y axis of the satellite of FIG. 2 and its operation will be completely analogous to that of the equipment described for the x axis. Of course it will be recognized that other means for producing small correcting torques may be employed, the only requirement being that their net effect may be controlled and reversed in response to the control signals provided for the drive motors of the principal attitude control mechanism. It is possible, for example, to combine various torque-producing arrangements with various remotely controlled attitude control systems. In addition, it will be evident that in the arrangement of FIG. 2, the system for producing correcting torques may be simplified by employing only a single oscillator having two quadrature outputs and switching these outputs between a plurality of appropriately located current-carrying loops to control the accumulation of angular momentum about both the x and y axes.

What is claimed is:

1. In a space satellite arranged to receive attitude control signals from a remote location, a controlled mass within the satellite arranged for rotation about a predetermined axis of the satellite to be controlled, means responsive to an external control signal for producing rotation of the controlled mass about said axis in a sense opposite to that required for rotation of the satellite, means acting in aid of said last-mentioned means for opposing accumulation of a net angular momentum of the satellite about said axis, and means for reversing the effect of said last-mentioned means each time said rotation means reverses in response to said external means.

2. In a spaced satellite vehicle arranged to receive attitude control signals from a remote location, means responsive to a control signal for producing angular acceleration of the satellite about a predetermined axis, and means for opposing the accumulation of a net angular momentum of the satellite about such axis comprising an array of vanes mounted about the periphery of the satellite in a plane normal to the axis to be controlled and presenting corresponding surfaces to radiation from the sun, said surfaces extending in planes including the axis to be controlled, coatings on the corresponding surfaces of said vanes advanced toward the sun upon the accumulation of said net angular momentum arranged to reflect solar energy, coatings on the opposite surfaces of said vanes arranged to absorb solar energy, and means to reverse at least a majority of said vanes to present their opposite surfaces to solar energy each time said control means reverses in response to signals from said remote location.

3. In a space satellite vehicle, means arranged to receive attitude control signals from a remote location, means responsive to a control signal for producing angular acceleration of the satellite above a predetermined axis, means for opposing the accumulation of a net angular momentum of the satellite comprising a plurality of current loops mounted on the satellite in planes intersecting along the axis to be controlled, means for generating currents for application to said loops which are phased in correspondence with the angular separation of said loops, and means for applying said currents to the respective loops to interact with the earth's field to produce a correcting torque about said axis.

4. In a space satellite vehicle, means arranged to receive attitude control signals from a remote location, means responsive to a control signal for producing angular acceleration of the satellite about a predetermined axis, means for opposing the accumulation of a net angular momentum of the satellite comprising a plurality of current loops mounted on the satellite in planes intersecting along the axis to be controlled, means for generating currents for application to said loops which are phased in correspondence with the angular separation of said loops, means for applying said currents to the respective loops to interact with the earth's field to produce a correcting torque about said axis, and means for reversing the phase of each of said currents each time said control means reverses in response to said signals from said remote location.

5. In a space satellite vehicle, means arranged to receive attitude control signals from a remote location, means responsive to a control signal for producing angular acceleration of the satellite about a predetermined axis, means for opposing the accumulation of a net angular momentum of the satellite comprising a plurality of current loops mounted on the satellite in planes intersecting along the axis to be controlled, means for generating currents for application to said loops which are phased in correspondence with the angular separation of said loops, means for applying said currents to the respective loops to interact with the earth's field to produce a correcting torque about said axis, and means for reversing the phase of at least a majority of said currents each time said control means reverses in response to said signals from said remote location.

References Cited in the file of this patent

UNITED STATES PATENTS

| | | |
|---|---|---|
| 2,856,142 | Haviland | Oct. 14, 1958 |
| 2,973,162 | Haeussermann | Feb. 28, 1961 |

OTHER REFERENCES

Navigation (quarterly magazine), Spring, 1958, pages 66–71.